(12) United States Patent
Ye et al.

(10) Patent No.: US 9,873,421 B2
(45) Date of Patent: Jan. 23, 2018

(54) CONTROL OF ENGINE PULSE TORQUE CANCELLATION COMMANDS

(71) Applicant: GM GLOBAL TECHNOLOGY OPERATIONS LLC, Detroit, MI (US)

(72) Inventors: Shaochun Ye, Northville, MI (US); Michael D. Potts, Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 34 days.

(21) Appl. No.: 15/147,446

(22) Filed: May 5, 2016

(65) Prior Publication Data

US 2017/0320480 A1 Nov. 9, 2017

(51) Int. Cl.
*B60W 20/00* (2016.01)
*B60W 10/08* (2006.01)
(Continued)

(52) U.S. Cl.
CPC ............. *B60W 20/00* (2013.01); *B60K 6/365* (2013.01); *B60K 6/547* (2013.01); *B60W 10/06* (2013.01); *B60W 10/08* (2013.01); *B60W 2510/0657* (2013.01); *B60W 2510/083* (2013.01); *B60Y 2200/92* (2013.01); *B60Y 2300/1882* (2013.01);
(Continued)

(58) Field of Classification Search
CPC ...... B60W 20/00; B60W 10/06; B60W 10/08; B60W 2510/0657; B60W 2510/083; B60K 6/365; B60K 6/547; B60Y 2200/92; B60Y 2300/1882; B60Y 2300/205;
(Continued)

(56) References Cited

U.S. PATENT DOCUMENTS 8,261,864 B2 9/2012 Bhattarai et al.
8,849,460 B2 9/2014 Ye et al.
(Continued)

*Primary Examiner* — Marthe Marc-Coleman
(74) *Attorney, Agent, or Firm* — Quinn IP Law

(57) ABSTRACT

A powertrain assembly includes a transmission, an engine, first and second motor/generators and a controller. The controller includes a processor and memory on which is recorded instructions for executing a method for controlling engine pulse torque cancellation commands. The controller is programmed to determine an engine pulse torque ($T_P$). The controller is programmed to calculate a first motor torque pulse command ($T_A$) for the first motor/generator as a product of a first gear factor ($G_1$), the engine pulse torque ($T_P$) and a first ratio ($I_A/I_E$) of a predetermined first moment of inertia ($I_A$) for the first motor/generator and a predetermined engine moment of inertia ($I_E$). Similarly, the controller is programmed to calculate a second motor torque pulse command ($T_B$) for the second motor/generator. The controller is programmed to control the first and second motor/generators in response to the first and second motor torque pulse commands, respectively.

17 Claims, 2 Drawing Sheets

(51) Int. Cl.
  *B60W 10/06* (2006.01)
  *B60K 6/365* (2007.10)
  *B60K 6/547* (2007.10)

(52) U.S. Cl.
  CPC ..... *B60Y 2300/205* (2013.01); *B60Y 2300/60* (2013.01); *B60Y 2400/73* (2013.01); *Y10S 903/911* (2013.01); *Y10S 903/93* (2013.01); *Y10S 903/951* (2013.01)

(58) Field of Classification Search
  CPC ............. B60Y 2300/60; B60Y 2400/73; Y10S 903/911; Y10S 903/93; Y10S 903/951
  USPC ....... 701/22, 99; 180/65.285, 65.265, 65.21; 903/903, 902, 930
  See application file for complete search history.

(56) References Cited

U.S. PATENT DOCUMENTS

2009/0118964 A1* 5/2009 Snyder .................. B60W 10/24
                                                            701/99
2016/0039406 A1   2/2016 Liu et al.

* cited by examiner

CONTROL OF ENGINE PULSE TORQUE CANCELLATION COMMANDS

TECHNICAL FIELD

The disclosure relates generally to pulse cancellation torque control in a powertrain assembly.

BACKGROUND

Powertrain systems generally include control systems that execute auto-stop and auto-start control schemes to turn the engine on and off during operation. During an engine auto-start (auto-stop), compression torque pulses may be generated in the individual cylinders of the engine, resulting in vibration and noise.

SUMMARY

A powertrain assembly includes a transmission having at least one planetary gear set, an engine having a predetermined engine moment of inertia ($I_E$) and a controller. A first motor/generator is operatively connected to the transmission and has a predetermined first moment of inertia ($I_A$). A second motor/generator is operatively connected to the transmission and has a predetermined second moment of inertia ($I_B$). The controller includes a processor and memory on which is recorded instructions for executing a method for controlling engine pulse torque cancellation commands. The engine pulse torque cancellation commands include a first motor torque pulse command ($T_A$) and a second motor torque pulse command ($T_B$) which counteract the actual engine pulse torque and reduce the effect of engine pulse torque disturbances.

Execution of the instructions causes the controller to determine an engine pulse torque ($T_P$). The first motor torque pulse command ($T_A$) is calculated for the first motor/generator as a product of a first gear factor ($G_A$), the engine pulse torque ($T_P$) and a first ratio ($I_A/I_E$) of a predetermined first moment of inertia ($I_A$) for the first motor/generator and a predetermined engine moment of inertia ($I_E$). The second motor torque pulse command ($T_B$) is calculated for the second motor/generator as a product of a second gear factor ($G_B$), the engine pulse torque ($T_P$) and a second ratio ($I_B/I_E$) of predetermined second moment of inertia ($I_B$) for the second motor/generator, an engine moment of inertia ($I_E$).

The first motor/generator is controlled based on the first motor torque pulse command ($T_A$) and the second motor/generator motor is controlled based on the second motor torque pulse command ($T_B$), thereby effectively canceling engine pulse torque. The controller may be programmed to determine the engine pulse torque ($T_P$) during execution of an auto-start operation in a non-firing engine operation. The controller may be programmed to determine the engine pulse torque ($T_P$) during execution of an auto-stop operation in a non-firing engine operation.

The controller may be programmed to set a change ($\Delta N_O$) in speed of the output member which may be zero ($\Delta N_O=0$). The controller may be programmed to set a change ($\Delta N_I$) in speed of the input member which may be approximately equal to a change ($\Delta N_E$) in engine speed ($\Delta N_I=\Delta N_E$). The transmission may be characterized by a first gear length ($a_n$) from a first node to a second node, a second gear length ($b_n$) from the second node to a third node and a third gear length ($c_n$) from the third node to a fourth node. The first gear factor ($G_A$) may be a function of at least two of the first gear length, the second gear length and the third gear length. In a first embodiment, the first gear factor ($G_A$) may be defined as $G_A=[(b_1+c_1)/b_1]$ and the second gear factor ($G_B$) may be defined as $G_B=-(a_1/b_1)$. In a second embodiment, the first gear factor ($G_A$) may defined as $G_A=-[(c_2/b_2)]$ and second gear factor ($G_B$) may be defined as $G_B=[(a_2+b_2)/b_2]$.

In a third embodiment, the transmission may be characterized by a first gear length ($a_3$) from a first node to a second node and a second gear length ($b_3$) from the second node to a third node. The first gear factor ($G_A$) may be defined as $G_A=-[(b_3/a_3)]$ and the second gear factor ($G_B$) may be zero.

The above features and advantages and other features and advantages of the present invention are readily apparent from the following detailed description of the best modes for carrying out the invention when taken in connection with the accompanying drawings.

DETAILED DESCRIPTION

Figure 1:
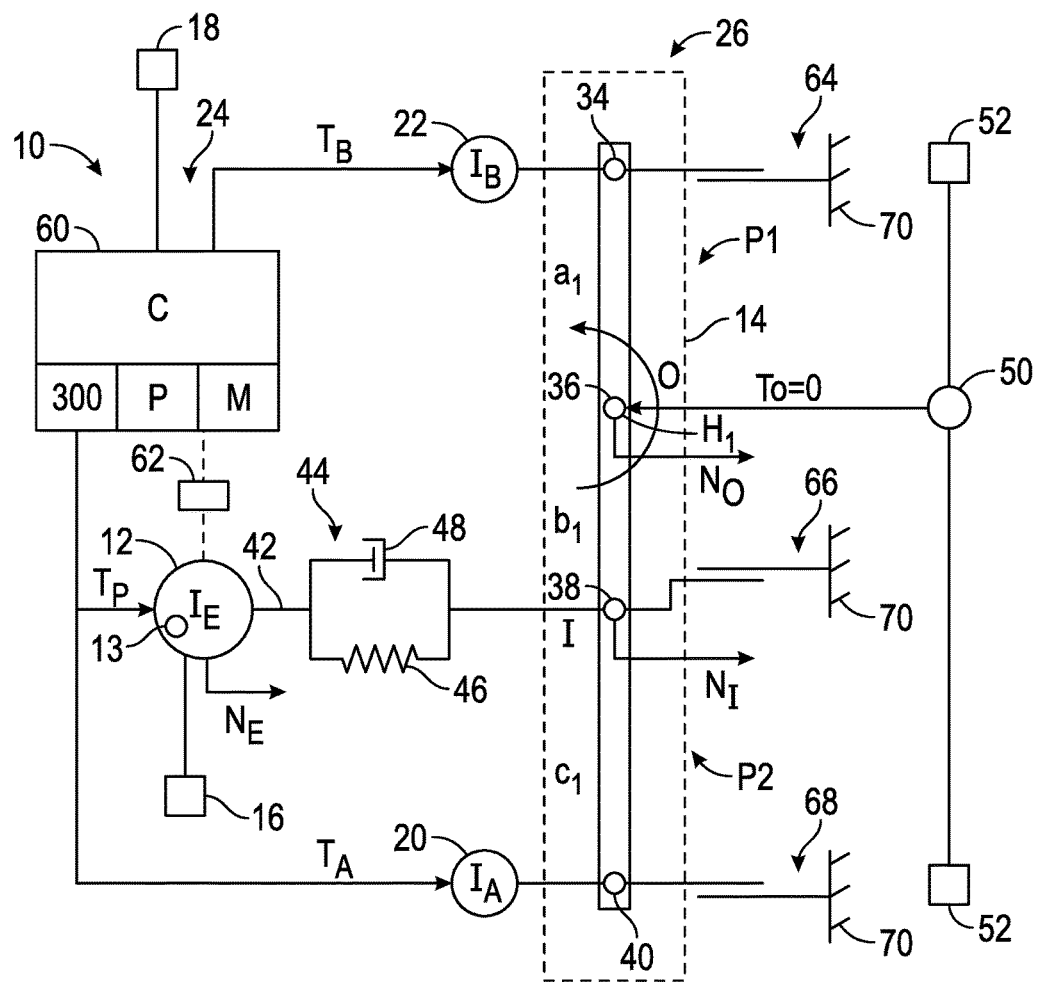
FIG. 1 is a schematic illustration of a first powertrain assembly in accordance with a first embodiment of the disclosure.

Referring to the drawings, wherein like reference numbers refer to like components, FIG. 1 schematically illustrates a powertrain assembly 10, in accordance with a first embodiment of the disclosure. The assembly 10 includes an internal combustion engine 12 and a transmission 14 having an input member (I), and an output member (O). The assembly 10 includes first and second motor/generators 20, 22 operatively connected to the transmission 14. The first and second motor/generators 20, 22 may be relatively high-voltage, poly-phase electric machines or any other type of machine known to those skilled in the art that is capable of generating torque.

Referring to FIG. 1, the assembly 10 may be part of a device 24. The device 24 may be a strong hybrid electric vehicle, defined as having multiple sources of input torque, including but not limited to, the internal combustion engine 12 and the first and second motor/generators 20, 22. The device 24 may be a mobile platform, including, but not limited to, standard passenger vehicle, sport utility vehicle, light truck, heavy duty vehicle, ATV, minivan, bus, transit vehicle, bicycle, robot, farm implement, sports-related equipment, boat, plane, train or any other transportation device. The device 24 may take many different forms and include multiple and/or alternate components.

Figure 4:
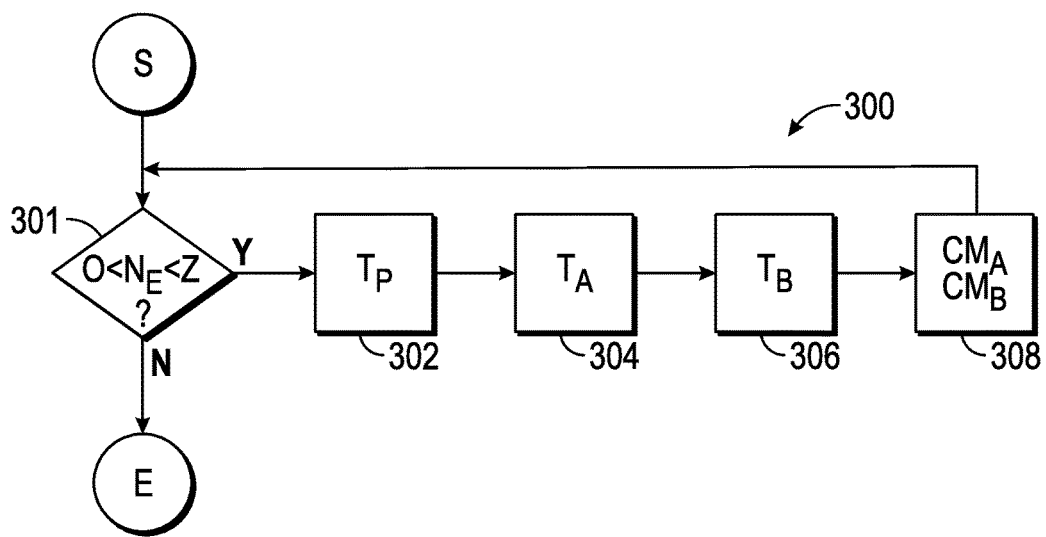
FIG. 4 is a schematic illustration of another powertrain assembly in accordance with a third embodiment of the disclosure.
Figure 3:
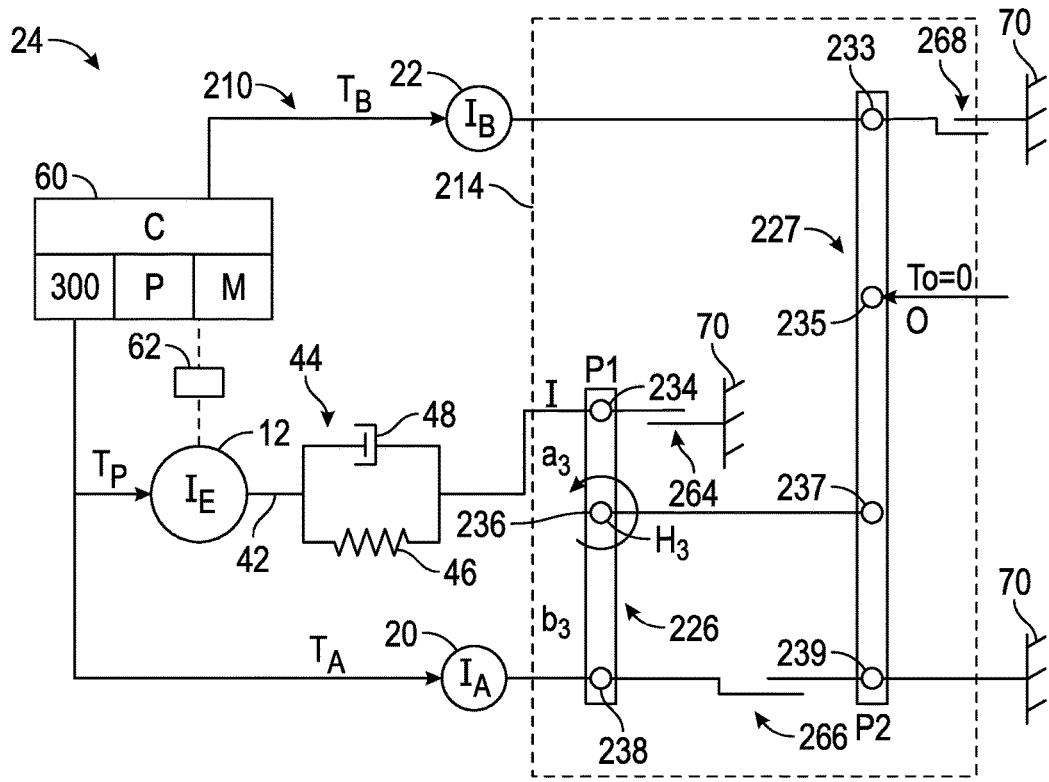
FIG. 3 is a schematic illustration of another powertrain assembly in accordance with a second embodiment of the disclosure.

In the first embodiment, the transmission 14 includes first and second planetary gear sets P1, P2, each having respective first, second and third members (not shown). The respective first, second and third members are represented by the nodes of a first lever 26 and may be embodied as respective ring gear, planetary carrier and sun gear members. The transmission 14 is shown in a schematic lever diagram format. As is well known in the art, multiple interconnected gear sets of a transmission may be reduced schematically to a single lever as shown in FIG. 1 (or a double lever as shown in FIGS. 3-4).

Referring to FIG. 1, the first lever 26 includes first, second, third and fourth nodes 34, 36, 38, 40. Referring to FIG. 1, the transmission 14 is characterized by a first gear length $a_1$ from the first node 34 to the second node 36, a second gear length $b_1$ from the second node 36 to the third node 38 and a third gear length $c_1$ from the third node 38 to the fourth node 40. The gear lengths $a_1$, $b_1$ and $c_1$ shown on the first lever 26 may be considered to be a number of gear teeth of each the gear elements embodying the various nodes.

Referring to FIG. 1, the engine 12 includes an output shaft 42 that rotates at engine speed (arrow $N_E$) with an engine torque ($T_E$). The output shaft 42 of the engine may be selectively connected to the input member (I) of the transmission 14 via actuation of a damper system 44, having a spring 46 and a damper 48. The output member 24 rotates with an output speed (arrow $N_O$). The output member (O) transmits an output torque (arrow $T_O$) to at least one axle 50 of the device 24, and ultimately to a set of wheels 52 to propel the device 24.

In the first embodiment, the input member (I) and the output member (O) of the transmission 14 are connected to the third node 38 and the second node 36, respectively. The assembly 10 may include first, second and third clutches 64, 66, 68. Referring to FIG. 1, a stationary member 70 may be selectively connectable to the first node 34 via the first clutch 64, to the third node 38 via the second clutch 66 and to the fourth node 40 via the third clutch 68. The assembly 10 may include a user interface (not shown), which may include any type of input device known to those skilled in the art.

Referring to FIG. 1, a controller 60 is in communication, such as electronic communication, with various components of the assembly 10. The controller 60 includes a processor P and memory M, on which is recorded instructions for executing a method 300, described below with reference to FIG. 4, for controlling engine pulse torque cancellation commands.

The engine pulse torque cancellation commands include a first motor torque pulse command ($T_A$) (applied to the first motor/generator 20) and a second motor torque pulse command ($T_B$) (applied to the second motor/generator 22). The first and second motor torque pulse commands ($T_A$, $T_B$) counteract the actual engine pulse torque and reduce the effect of the engine pulse torque disturbances.

The controller 60 (via execution of the method 300) improves the functioning and efficiency of the device 24 by providing effective pulse cancellation control. The method 300 is particularly effective when there is no damper lockup clutch. The method 300 may eliminate the requirement for the damper lockup clutch and the dual-stage damper.

The controller 60 is programmed to specifically execute the steps of method 300 and may employ one or more sensors. Referring to FIG. 1, the engine 12 and the first and second motor/generators 20, 22, are each characterized by respective moment of inertia values $I_E$, $I_A$ and $I_B$. The moment of inertia of a rigid body is a measure of the amount of resistance a body has to changing its state of rotational motion. The controller 60 may be programmed with predetermined inertia values $I_E$, $I_A$ and $I_B$ for the engine 12 and the first and second motor/generators 20, 22, respectively.

An objective of the method 300 is to ensure that an oscillation or change ($\Delta N_O$) in the rotational speed of the output member (O) is zero ($\Delta N_O=0$). This allows the "output bump" or noise to be reduced. Another objective of the method 300 is to ensure that a change ($\Delta N_I$) in speed of the input member (I) is approximately equal to a change ($\Delta N_E$) in engine speed ($\Delta N_I=\Delta N_E$). This ensures that the damper resonance will not be excited. Referring to FIG. 1, meeting the objectives means that the first lever 26 and the engine 12 are configured to rotate around the hinge point $H_1$ (coinciding with the output member (O) at the second node 36) with the same angular velocity $\omega_1$. There is no torque between the engine 12 and transmission input (I), since ($\Delta N_E=\Delta N_I$).

Figure 2:
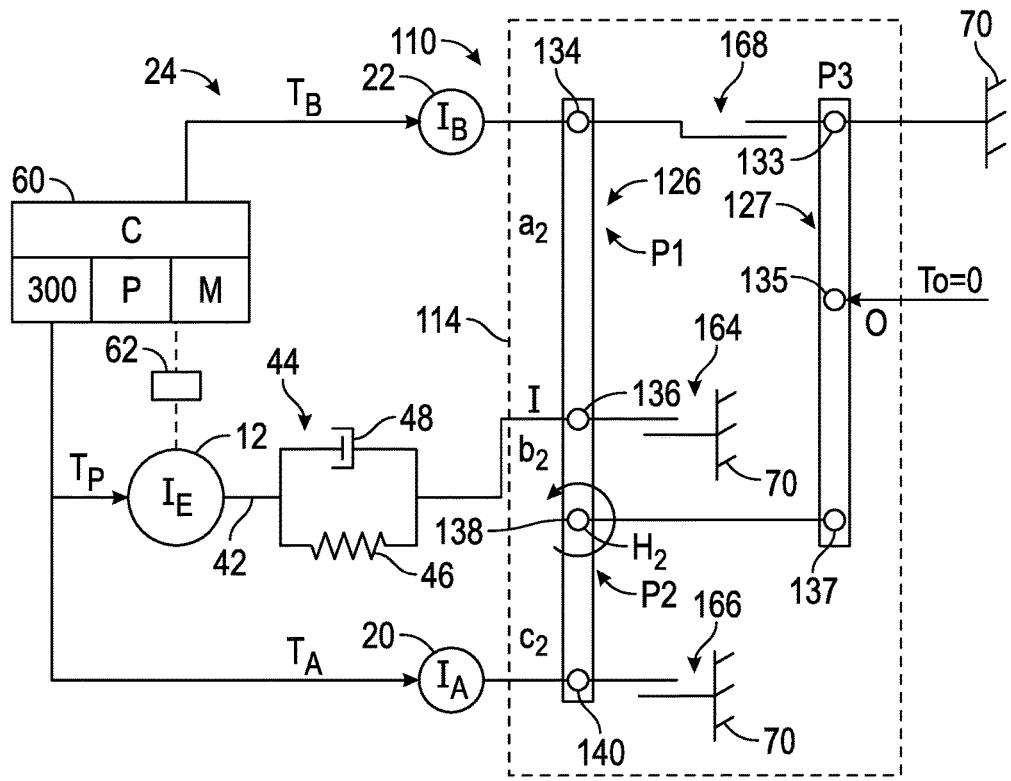
FIG. 2 is a flow chart describing a method for controlling pulse cancellation torques.

Referring to FIG. 2, described below, a powertrain assembly 110 is shown, in accordance with a second embodiment of the disclosure. Assembly 110 is similar to the assembly 10, except for the differences described below. Referring to FIG. 2, the assembly 110 includes a transmission 114 shown in schematic lever diagram format known to those skilled in the art, with a first lever 126 and a second lever 127.

In the second embodiment, the transmission 114 includes first, second and third planetary gear sets P1, P2, and P3, each having respective first, second and third members (not shown). The respective first, second and third members are represented by the nodes of the first lever 126 and the second lever 127 and may be embodied as respective ring gear, planetary carrier and sun gear members. Referring to FIG. 2, the first lever 126 includes first, second, third and fourth nodes 134, 136, 138 and 140. The second lever 127 includes fifth, sixth and seventh nodes 133, 135 and 137.

Referring to FIG. 2, the transmission 114 is characterized by a first gear length $a_2$ from the first node 134 to the second node 136, a second gear length $b_2$ from the second node 136 to the third node 138 and a third gear length $c_2$ from the third node 138 to the fourth node 140. The gear lengths $a_2$, $b_2$ and $c_2$ shown on the first lever 126 may be considered to be a number of gear teeth of each the gear elements embodying the various nodes. The same objectives of the method 300 described above [($\Delta N_O=0$) and ($\Delta N_I=\Delta N_E$)] apply to the second embodiment. Referring to FIG. 2, the first lever 126 and the second lever 127 are configured to rotate around a hinge point $H_2$ (coinciding with the third node 138) with the same angular velocity $\omega_2$. The assembly 110 may include first, second and third clutches 164, 166, 168. Referring to FIG. 2, a stationary member 70 may be selectively connectable to the second node 136 via the first clutch 164, to the fourth node 140 via the second clutch 166 and to the first node 134 via the third clutch 168.

Referring to FIG. 3, a powertrain assembly 210 is shown, in accordance with a third embodiment of the disclosure. Assembly 210 is similar to the assembly 10, except for the differences described below. Referring to FIG. 2, the assembly 210 includes a transmission 214 shown in schematic lever diagram format, with a first lever 226 and a second lever 227.

In the third embodiment, the transmission 214 includes first, second and third planetary gear sets P1, P2, P3, each having respective first, second and third members (not shown). The respective first, second and third members are represented by the nodes of the first lever 226 and the second lever 227 and may be embodied as respective ring gear, planetary carrier and sun gear members. Referring to FIG. 3, the first lever 226 includes first, second and third nodes 234, 236 and 238. The second lever 227 includes fourth, fifth, sixth and seventh nodes 233, 235, 237 and 239.

Referring to FIG. 3, the transmission 214 is characterized by a first gear length $a_3$ from the first node 234 to the second node 236 and a second gear length $b_3$ from the second node 236 to the third node 238. The gear lengths $a_3$ and $b_3$ shown on the first lever 226 may be considered to be a number of gear teeth of each the gear elements embodying the various nodes. The assembly 210 may include first, second and third clutches 264, 266, 268. Referring to FIG. 3, a stationary member 70 may be selectively connectable to the first node 234 via the first clutch 264 and to the fourth node 233 via the third clutch 268. The second clutch 266 may selectively connect the third node 238 with the seventh node 239.

In the first and second embodiments both the first and second motor/generators 20, 22 are employed to cancel the engine pulse torque, whereas in the third embodiment, only the first motor/generator 20 is employed to cancel the engine pulse torque. Referring to FIGS. 1-3, the output torque is assumed to be equal to zero ($T_O=0$) in all embodiments.

The same objectives of the method 300 described above [($\Delta N_O=0$) and ($\Delta N_I=\Delta N_E$)] apply to the third embodiment. Referring to FIG. 3, the first lever 226 is isolated such that the engine 12 and the first motor/generator 20 must rotate around the hinge point $H_3$ with the same angular velocity $\omega_3$. Additionally, the assumed pulse torque output ($T_o$) of the first lever 226 through the hinge (H) is zero, which will ensure that the second lever 227 is stationary and outputs zero engine torque due to the engine pulse ($T_P$). Therefore, the second motor/generator 22 is not required to compensate for the engine pulses. Referring to FIG. 3, if the engine pulse torque is canceled by just using the first motor/generator 20 (first lever 226 in this embodiment), no engine pulse torque will be transmitted to the second lever 226. Stated differently, the pulse torque output of the first lever 226 to the second lever 227 (through the hinge $H_3$) is zero because the engine pulse torque is cancelled entirely with the first motor/generator 20.

Referring now to FIG. 4, a flowchart of the method 300 stored on and executable by the controller of FIG. 1 is shown. In the method 300, an arithmetic torque split is imposed on the first and second motor/generators 20, 22 to preserve the objectives outlined above. The method 300 may be recited in any order and one or more of the blocks/steps may be eliminated. The start and end of the method 300 are shown by "S" and "E" respectively.

In block 301 of FIG. 4, the controller 60 is programmed to determine if the present engine speed ($N_E$) is above 0 and less than a threshold speed Z, i.e. In other words, pulse cancellation control is activated when 0<Ne<Z. If the present engine speed ($N_E$) is within the range 0<Ne<Z, the method 300 proceeds to block 302. If the present engine speed ($N_E$) is outside this range, the method 300 is ended or the respective commands ($CM_A$ and $CM_B$), determined in block 308, are cancelled, or aborted in some manner, instantaneously or over a predefined time. The controller 60 may obtain the present engine speed ($N_E$) via a speed sensor 62 that is oriented relative to the output shaft 42 to directly measure the engine speed ($N_E$). Alternatively, the controller 60 may receive the engine speed ($N_E$) as a reported value, such as from an engine control module (not shown), or be estimated or modeled using any method known to those skilled in the art.

In block 302 of FIG. 4, the controller 60 is programmed to determine an engine pulse torque ($T_P$). Referring to FIG. 1, the engine 12 includes one or more cylinders 13. The estimated engine pulse torque ($T_P$) is thus the engine torque associated with spinning the unfired engine. The engine pulse torque ($T_P$) may be estimated as a sum of the predicted cylinder pulse torque values for each cylinder 13 of the engine 12. The cylinder pulse torque for a given cylinder 13 includes the estimated cylinder pressure multiplied by a torque ratio. The cylinder torque model may estimate cylinder pressure based upon compression pulses generated by crankshaft rotation. Each cylinder pulse torque is predicted by multiplying a torque ratio by a cylinder pressure ($C_P$).

The cylinder pressure ($C_P$) in an unfired cylinder 13 may be estimated in accordance with the following relationship: $(C_P*C_C)^{1.3}$=constant.

Here, $C_P$ is cylinder pressure which can be determined based upon intake air mass and temperature, and $C_V$ is the cylinder volume. The torque ratio may be determined for each cylinder 13 as a function of crank angle ($\theta$), which encompasses changes in cylinder geometry and cylinder friction. Any cylinder torque model known to those skilled in the art may be employed to determine the cylinder pulse torque on each of the unfired cylinders 13. In one example, engine parameters such as engine crank angle ($\theta$) (which may be obtained via a crank angle sensor 16 operatively connected to the engine 12) and a manifold pressure (which may be obtained via a manifold pressure sensor 18 operatively connected to the controller 60) are used to determine the cylinder pulse torque.

The engine pulse torque ($T_P$) may be estimated via any model known to those skilled in the art. The controller 60 may be programmed to determine the engine pulse torque ($T_P$) during execution of an auto-start or auto-stop operation in a non-firing engine operation.

In block 304 of FIG. 4, the controller 60 is programmed to calculate a first motor torque pulse command ($T_A$) for the first motor/generator 20 as a product of a first gear factor ($G_A$), the estimated engine pulse torque ($T_P$) and a first ratio ($I_A/I_E$) of a predetermined first moment of inertia ($I_A$) for the first motor/generator 20 and a predetermined engine moment of inertia ($I_E$). The first motor torque pulse command ($T_A$) may be defined as:

$$T_A=G_A*(I_A/I_E)*T_P. \quad (1)$$

The method 300 may proceed to block 306. In block 306 of FIG. 4, the controller 60 is programmed to calculate a second motor torque pulse command ($T_B$) for the second motor/generator 22 as a product of a second gear factor ($G_B$), the estimated engine pulse torque ($T_P$) and a second ratio ($I_B/I_E$) of the predetermined second moment of inertia ($I_B$) for the second motor/generator 22 and the engine moment of inertia ($I_E$). The second motor torque pulse command ($T_B$) may be defined as:

$$T_B=G_B*(I_B/I_E)*T_P. \quad (2)$$

Applying the objectives of method 300 [($\Delta N_O=0$) and ($\Delta N_I=\Delta N_E$)] produces the following equations for the first embodiment shown in FIG. 1:

$$T_A=[(b_1+c_1)/b_1]*(I_A/I_E)*T_P \quad (3)$$

$$T_B=-(a_1/b_1)*(I_B/I_E)*T_P \quad (4)$$

In the first embodiment, the first gear factor ($G_A$) is a function of the second gear length ($b_1$) and the third gear length ($c_1$), with the first gear factor ($G_A$) being defined as $G_A=[(b_1+c_1)/b_1]$. In the first embodiment, the second gear factor ($G_B$) is a function of the first gear length ($a_1$) and the second gear length ($b_1$), with the second gear factor ($G_B$) being defined as $G_B=-(a_1/b_1)$.

Applying the objectives of method 300 [($\Delta N_O=0$) and ($\Delta N_I=\Delta N_E$)] produces the following equations for the second embodiment shown in FIG. 2:

$$T_A=-(C_2/b_2)*(I_A/I_E)*T_P \quad (5)$$

$$T_B=[(a_2+b_2)/b_2]*(I_B/I_E)*T_P \quad (6)$$

In the second embodiment, the first gear factor ($G_A$) is a function of the second gear length ($b_2$) and the third gear length ($c_2$), with the first gear factor ($G_A$) being defined as $G_A=-[(c_2/b_2)]$. In the first embodiment, the second gear factor ($G_B$) is a function of the first gear length ($a_2$) and the second gear length ($b_2$), with the second gear factor ($G_B$) being defined as $G_B=[(a_2+b_2)/b_2]$.

Applying the objectives of method 300 [($\Delta N_O=0$) and ($\Delta N_I=\Delta N_E$)] produces the following equations for the third embodiment shown in FIG. 3:

$$T_A=-(b_3/a_3)*(I_A/I_E)*T_P \quad (7)$$

$$T_B=0 \quad (8)$$

In the third embodiment, the first gear factor ($G_A$) is defined as $G_A=-[(b_3/a_3)]$ and the second gear factor ($G_B$) is zero.

The method 300 may proceed to block 308. In block 308 of FIG. 4, the controller 60 is programmed to control the first motor/generator 20 in response to the first motor torque pulse command ($T_A$) and control the second motor/generator motor 22 in response to the second motor torque pulse command ($T_B$). Stated differently, the first motor torque pulse command ($T_A$) calculated at block 304 and the second motor torque pulse command ($T_B$) calculated at block 306 are applied respectively to the first and second motor/generators 20, 22, via transmission of respective commands (listed in FIG. 4 as $CM_A$ and $CM_B$) from the controller 60. The respective commands ($CM_A$ and $CM_B$) may be executed via control processors (not shown) embedded in the first and second motor/generators 20, 22. The method 300 may proceed back to block 301. If the present engine speed (NE) is outside the range 0<Ne<Z, the respective commands (CMA and CMB) are cancelled or aborted in some manner, instantaneously or over a predefined time.

Controller 60 of FIGS. 1-3 includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A powertrain assembly comprising:
 a transmission having an input member, an output member and at least one planetary gear set;
 an engine operatively connected to the transmission and having a predetermined engine moment of inertia ($I_E$);
 a first motor/generator operatively connected to the transmission and having a predetermined first moment of inertia ($I_A$);
 a second motor/generator operatively connected to the transmission and having a predetermined second moment of inertia ($I_B$); and
 a controller in communication with the transmission, the controller including a processor and memory on which is recorded instructions for controlling engine pulse torque cancellation commands;
 wherein the engine pulse torque cancellation commands include a first motor torque pulse command ($T_A$) and a second motor torque pulse command ($T_B$);
 wherein execution of the instructions causes the controller to:
  determine an engine pulse torque ($T_P$);
  calculate the first motor torque pulse command ($T_A$) for the first motor/generator as a product of a first gear factor ($G_A$), the engine pulse torque ($T_P$) and a first ratio ($I_A/I_E$) of the predetermined first moment of inertia ($I_A$) and the predetermined engine moment of inertia ($I_E$);
  calculate the second motor torque pulse command ($T_B$), for the second motor/generator as a product of a second gear factor ($G_B$), the engine pulse torque ($T_P$) and a second ratio ($I_B/I_E$) of the predetermined second moment of inertia ($I_B$) and the predetermined engine moment of inertia ($I_E$); and
  control the first motor/generator based on the first motor torque pulse command ($T_A$) and control the second motor/generator based on the second motor torque pulse command ($T_B$).

2. The assembly of claim 1, wherein the controller is programmed to determine the engine pulse torque ($T_P$) during execution of an auto-start operation in a non-firing engine operation.

3. The assembly of claim 1, wherein the controller is programmed to determine the engine pulse torque ($T_P$) during execution of an auto-stop operation in a non-firing engine operation.

4. The assembly of claim 1, wherein a change ($\Delta N_O$) in speed of the output member is zero ($\Delta N_O=0$).

5. The assembly of claim 1, wherein a change ($\Delta N_I$) in speed of the input member is approximately equal to a change ($\Delta N_E$) in a speed of the engine ($\Delta N_I=\Delta N_E$).

6. The assembly of claim 1:
wherein the transmission is characterized by a first gear length ($a_n$) from a first node to a second node, a second gear length ($b_n$) from the second node to a third node and a third gear length ($c_n$) from the third node to a fourth node; and
wherein the first gear factor ($G_A$) is a function of at least two of the first gear length, the second gear length and the third gear length.

7. The assembly of claim 6, wherein:
the first gear factor ($G_A$) is a function of the second gear length ($b_1$) and the third gear length ($c_1$), the first gear factor ($G_A$) being defined as $G_A=[(b_1+c_1)/b_1]$; and
the second gear factor ($G_B$) is a function of the first gear length ($a_1$) and the second gear length ($b_1$), the second gear factor ($G_B$) being defined as $G_B=-(a_1/b_1)$.

8. The assembly of claim 6, wherein:
the first gear factor ($G_A$) is a function of the second gear length ($b_2$) and the third gear length ($c_2$), the first gear factor ($G_A$) being defined as $G_A=-[(c_2\ b_2)]$; and
the second gear factor ($G_B$) is a function of the first gear length ($a_2$) and the second gear length ($b_2$), the second gear factor ($G_B$) being defined as $G_B=[(a_2+b_2)/b_2]$.

9. The assembly of claim 1, wherein:
the transmission is characterized by a first gear length ($a_3$) from a first node to a second node and a second gear length ($b_3$) from the second node to a third node;
the first gear factor ($G_A$) is defined as $G_A=-[(b_3/a_3)]$; and
the second gear factor ($G_B$) is zero.

10. A method of controlling engine pulse torque cancellation commands in a powertrain assembly having an engine, a first motor/generator, a second motor/generator, a controller and a transmission having at least one planetary gear set, an input member and an output member, the method comprising:
determining an engine pulse torque ($T_P$), via the controller;
wherein the engine pulse torque cancellation commands include a first motor torque pulse command ($T_A$) and a second motor torque pulse command ($T_B$);
calculating the first motor torque pulse command ($T_A$), via the controller, for the first motor/generator as a product of a first gear factor ($G_1$), the engine pulse torque ($T_P$) and a first ratio ($I_A/I_E$) of a predetermined first moment of inertia ($I_A$) for the first motor/generator and a predetermined engine moment of inertia ($I_E$) for the engine;
calculating the second motor torque pulse command ($T_B$), via the controller, for the second motor/generator as a product of a second gear factor ($G_2$), the engine pulse torque ($T_P$) and a second ratio ($I_B/I_E$) of a predetermined second moment of inertia ($I_B$)) for the second motor/generator and the predetermined engine moment of inertia ($I_E$); and
controlling the first motor/generator based on the first motor torque pulse command and controlling the second motor/generator based on the second motor torque pulse command.

11. The method of claim 10, wherein a change ($\Delta N_O$) in speed of the output member is zero ($\Delta N_O=0$).

12. The method of claim 11, wherein a change ($\Delta N_I$) in speed of the input member is approximately equal to a change ($\Delta N_E$) in engine speed ($\Delta N_I=\Delta N_E$).

13. The method of claim 10:
wherein the transmission is characterized by a first gear length from a first node to a second node, a second gear length from the second node to a third node and a third gear length from the third node to a fourth node; and
wherein the first gear factor ($G_A$) is a function of at least two of the first gear length, the second gear length and the third gear length.

14. The method of claim 13, wherein:
the first gear factor ($G_A$) is a function of the second gear length ($b_1$) and the third gear length ($c_1$), the first gear factor ($G_A$) being defined as $G_A=[(b_1+c_1)/b_1]$; and
the second gear factor ($G_B$) is a function of the first gear length ($a_1$) and the second gear length ($b_1$), the second gear factor ($G_B$) being defined as $G_B=-(a_1/b_1)$.

15. The method of claim 13, wherein:
the first gear factor ($G_A$) is a function of the second gear length ($b_2$) and the third gear length ($c_2$), the first gear factor ($G_A$) being defined as $G_A=-[(c_2/b_2)]$; and
the second gear factor ($G_B$) is a function of the first gear length ($a_2$) and the second gear length ($b_2$), the second gear factor ($G_B$) being defined as $G_B=[(a_2+b_2)/b_2]$.

16. The method of claim 13, wherein:
the transmission is characterized by a first gear length ($a_3$) from a first node to a second node and a second gear length ($b_3$) from the second node to a third node;
the first gear factor ($G_A$) is defined as $G_A=-[(b_3/a_3)]$; and
the second gear factor ($G_B$) is zero.

17. A hybrid vehicle comprising:
a transmission having an input member, an output member and at least two planetary gear sets;
an engine operatively connected to the transmission and having a predetermined engine moment of inertia ($I_E$);
a first motor/generator operatively connected to the transmission and having a predetermined first moment of inertia ($I_A$);
a second motor/generator operatively connected to the transmission and having a predetermined second moment of inertia ($I_B$); and
a controller in communication with the transmission, the controller including a processor and memory on which is recorded instructions for controlling engine pulse torque cancellation commands;
wherein the engine pulse torque cancellation commands include a first motor torque pulse command ($T_A$) and a second motor torque pulse command ($T_B$);
wherein execution of the instructions causes the controller to:
determine an engine pulse torque ($T_P$);
calculate the first motor torque pulse command ($T_A$) for the first motor/generator as a product of a first gear factor ($G_A$), the engine pulse torque ($T_P$) and a first ratio ($I_A/I_E$) of the predetermined first moment of inertia ($I_A$) and the predetermined engine moment of inertia ($I_E$);
calculate the second motor torque pulse command ($T_B$), for the second motor/generator as a product of a second gear factor ($G_B$), the engine pulse torque ($T_P$) and a second ratio ($I_B/I_E$) of the predetermined second moment of inertia ($I_B$) and the predetermined engine moment of inertia ($I_E$); and
control the first motor/generator based on the first motor torque pulse command ($T_A$) and control the second motor/generator based on the second motor torque pulse command ($T_B$).

* * * * *